June 20, 1939. J. K. NITSCH 2,162,856
INDEXING WORK HOLDER
Original Filed Oct. 7, 1930
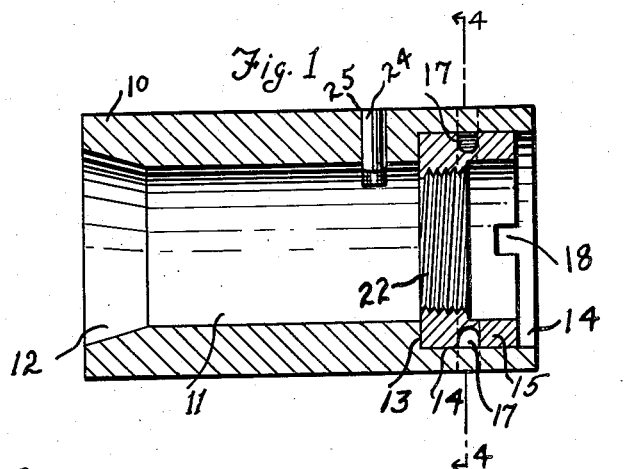
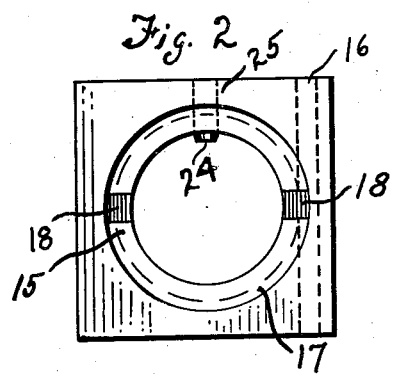
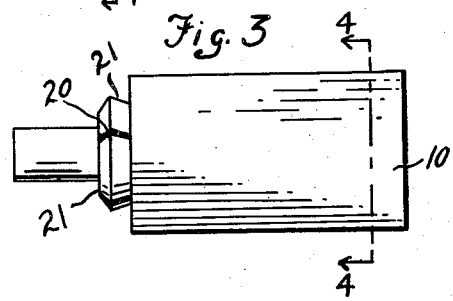
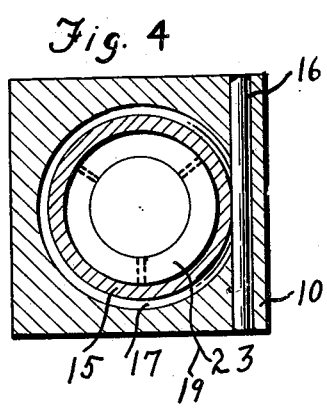
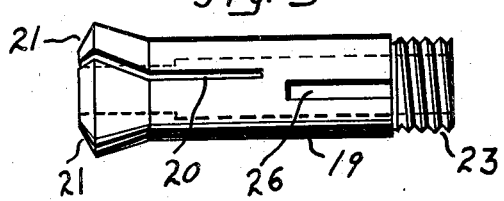
INVENTOR.
Joseph K. Nitsch
BY Charles Fiandaca,
his ATTORNEY.

Patented June 20, 1939

2,162,856

UNITED STATES PATENT OFFICE 2,162,856

INDEXING WORK HOLDER

Joseph K. Nitsch, Syracuse, N. Y.

Refiled for abandoned application Serial No. 487,063, October 7, 1930. This application April 20, 1937, Serial No. 137,920

3 Claims. (Cl. 90—59)

My invention relates to indexing work holders, and particularly to a device to be used in combination with standard split collet chucks for machining tools, punches, and for other purposes.

An object of my invention is to provide a device with means for releasably holding implements and parts to be machined in their true center, and which can be readily turned and placed for indexing, machining and grinding without the necessity of taking new measurements with each change of position.

Another object of the invention is to provide a device which will afford more universal use from the present standard split collet chucks which is simple in construction, extremely efficient in operation, and very much lighter in weight than indexing devices in present universal use.

Another object is to provide a holding fixture which lends itself to a quick set-up without the use of a dividing head, for machining, grinding or laying out such tools as counterbores, reamers, taps, square shanks, broaches, punches, whether square, or rectangular, and in which the different surfaces to be machined or ground are readily found and positioned by simply flopping the fixture from one flat side to another for the purpose of indexing.

Further objects and advantages of the invention will be in part obvious and in part specifically pointed out in the specification and claims.

I have experienced that the use of a square block with a bore lying exactly in the center of said block so as to be parallel with the outer flat sides is a very handy device for milling punches for tool and die work, reamers, counterbores, and the like, inasmuch as the shanks of these tools are round and are usually made from round rod steel as it comes from the mill, after being cut to the proper length. In order to make such a block serve a useful need in a tool room, however, it is necessary to have a whole series of blocks for every different diameter of rod used. And to this difficulty is added the inaccuracy of sizing of drill rod. As is well known in the art, drill rod, cold rolled or tool steel often varies .005 of an inch or more either way in diameter from the size marked. To provide for this variation, then, it is necessary to provide a set-screw or other holding device on such a block to hold the piece of rod rigid in the bore of the block. The use of a set screw, however, has proven objectionable because it mars the work, and, if the variation of the stock is as much as .005 of an inch, the rod will not lie concentrically within said bore, but will be eccentric when tightening the set-screw thus rendering the block useless as an indexing tool because the operator cannot rely upon the known distance between the center of the bore and its sides as being the same due to the eccentric position of the rod in the bore, and in any event, the shank of the tool when finished will not be concentric with the cutting portion.

To obviate these difficulties and to increase the usefulness of such a block, I have devised the combination of such a block preferably with the ordinary split collet chuck universally known also as the draw-back chuck. As is well known, the split collet chuck is commercially made to a high degree of accuracy in relation to the concentricity of its bores, tapers, etc., and due to the slots milled in its sides (from whence it derives its name "split" collet chuck) it will accommodate variations in sizes of rod of $\frac{1}{16}$ inch or more, depending on the diameter of the collet chuck and the style and make used, and it will still retain concentricity of the rod held. Inasmuch as most tool rooms are already equipped with one or more sets of split collet chucks for the lathes, the usefulness of such a block will also increase the usefulness of the collet chucks and adapt them to a new and useful result. As is well known, also, the outer diameter of collet chucks sold in sets varies in steps of one-quarter inch or more, whereas the inner diameters are made in much lesser gradations. This fact makes it necessary for a shop equipped with a set of collet chucks to have but one or two blocks to have a complete run of sizes for ordinary tool and die work, whereas it would otherwise require hundreds of blocks and even then at a sacrifice of accuracy.

In use, the operator, knowing the distance between the center of the bore of the collet and any one of the four sides of the block may mill or grind one face of the piece being worked on, and then turn the block 90°, 180°, or 270°, depending on the particular face to be milled or ground, without the necessity of resetting the work in the collet or moving the table of the machine, or taking any vertical measurements, for all sides of the block are equally distant from the center of the collet chuck and parallel.

In the drawing,

Fig. 1 is a sectional central longitudinal view of the indexing block without a split collet chuck within the bore.

Fig. 2 is a rear elevation of the indexing block, without a collet chuck within the bore, showing the draw back nut.

Fig. 3 is a side elevation of the indexing block with the collet chuck in place in the bore of the block, and with an implement to be formed, held in place by the collet chuck, ready to be machined.

Fig. 4 is a sectional view on the line 4—4 of Fig. 3, showing more clearly the groove, and pin to retain the draw back nut.

Fig. 5 is an elevational view of an ordinary split collet chuck used in combination with the block shown.

Referring to the drawing the numeral 10 designates a block having a bore 11 in its interior with outwardly flared surfaces 12 adjacent its front end, and an annular shoulder 13 extending between the walls of the main bore 11 and an enlarged portion 14 of said bore at the rear end of the block 10 to provide a seat for the draw back nut 15. The draw back nut 15 is swiveled in the seat thus provided for it in the block 10 for free but preferably non-removable rotation by means of the retaining pin 16 which passes through the wall of the block 10 and into the groove 17 in the draw back nut 15. I have illustrated slots 18 in the face of the draw back nut 15 to receive a spanner wrench, and by this arrangement a smooth or flush surface is obtained on the rear of the device, and the draw back nut 15 may be readily turned by inserting the prongs of the usual spanner wrench in the slots 18, whether the piece of work held in the block protrudes without the block or not.

In Fig. 5 I have shown a standard split collet chuck, with a shank 19, provided with slits 20 along a portion of its length adjacent its tapered nose to provide a resiliency permitting concentric contraction and expansion so that its jaws 21 thus formed can close and open about the piece of work inserted within the chuck; it being noted that the shank 19 of the collet chuck will nicely fit in the main bore 11 of the block 10, and the jaws 21 are flared outwardly on their outside surface to fit against the outwardly flared wall 12 of the bore 11 when the parts are assembled and operated to grip a piece of work to be machined (usually the shank of a tool or punch to be formed).

The draw back nut 15 is interiorly screw threaded at 22 to fit over the end of the collet shank 23 which is also threaded so that the collet chuck can be inserted through the flared end 12 of the bore 11 of the block 10 until its threaded portion 23 engages with the threads 22 of the nut 15 at which time the spanner wrench is applied to the slots 18 on the nut 15 and the same is turned to draw the collet chuck inwardly of the block until the jaws 21 engage the flared wall 12 of the block; and if a piece of work has been inserted within the bore of the collet chuck, the chuck can no longer be drawn inwardly within the block 11 by turning nut 15 after the jaws 21 have contracted against the work, thereby holding the work rigidly and concentrically in relation to the outer flat surfaces of block 11.

To assist in holding the collet chuck rigidly within the bore 11 against axial rotation there is provided the key 24 which is insertible through an opening 25 in the wall of the block 10 to engage within a keyway 26 on the shank of the collet chuck. This arrangement allows longitudinal movement of the collet chuck within bore 11 while resisting axial rotation thereof.

It will be understood that my device can be made in any sizes necessary to accommodate standard or special chucks, and that it is adapted for use not only with clamping devices to engage its flat faces, but also with electro-magnetic holding means engaging a single face as well. It will also be noted that collet chucks having flat surfaces for holding disk-shaped work are also available, and that the combination herein described lends itself admirably to laying out work on a surface plate with the use of a surface gage provided with a scribing point.

Particular attention is called to the flat and angular exterior formation of the block 10, which in the drawing is illustrated as being square. This flat and angular formation is designed to enable and facilitate the machinist to hold the work in its true center and parallel with the table of the machine on which the block 10 is clamped or held; and to permit the work to be turned axially on any flat surface of the block 10 to machine the work about its periphery under accurate control, and with the same rigidity and accuracy of indexing as is obtainable in using a dividing head on a milling machine. And all this is feasible with the added advantages of being able to unclamp the block and work together and putting it on the magnetic chuck of a grinding machine without disturbing the position and setting of the work in relation to the holding fixture, that is, block 10.

In the embodiment shown the arrangement is particularly designed for machining and indexing tools with one, two, or four equal divisions such as flat or square punches, milling the four flutes on taps, end mills, reamers, etc. Other divisions of the circumference of the tool may be obtained by interposing a V block between the block 10 and the table of the machine; and still further divisions may be obtained by turning the work in the collet chuck after completing one revolution of the block 10 and starting over again when the work is re-clamped in the collet chuck.

It will be understood that any number of flat faces may be formed on the exterior of block 10. The more faces, the greater the number of divisions of the work periphery that will be obtainable. The limiting factor to the number of faces is that the flat faces must be sufficiently broad to furnish a rigid bearing and clamping surface for the block.

I claim:

1. In an indexing work holder in combination a split collet chuck provided with a longitudinal groove and a collet draw back nut threaded on said chuck; means for operatively retaining the same comprising a square block concentrically bored throughout its length, said bore tapering outwardly at one end for engagement with the tapered outer portion of said collet chuck and forming a recess at the other end to retain said draw back nut within said recess against longitudinal movement in the direction of the tapered portion of said block, the outer square surfaces of said block being longitudinally parallel with the axis of said bore and equi-distantly disposed in relation thereto; and detent means in the wall of said block slideably engaged by the said groove in the split collet chuck to allow longitudinal movement of said collet chuck while resisting rotary movement thereof.

2. In an indexing work holder in combination a split collet chuck and collet draw back nut; means for operatively retaining the same including a square block concentrically bored throughout its length, said bore tapering outwardly at one end for engagement with the tapered outer portion of said collet chuck and forming a recess at the other end to retain said draw back nut against longitudinal movement in the direction of the tapered portion of said block, the outer square surfaces of said block being longitudinally parallel with the axis of said bore and equi-distantly disposed in relation thereto; and detent means rotatively engaged by said draw back nut to prevent exit of said nut from said recess.

3. In combination an indexing work holder comprising a bored block having an angular longitudinal exterior; work holding means longitudinally disposed in said bore including a split collet chuck and a draw back nut retained within said bore and threaded on said collet chuck to cooperate with said chuck for releasably gripping work held within said chuck, said nut having slots on its outer edge to be engaged by the teeth of a spanner wrench, the work holding bore of said chuck being parallel with the exterior plane of the sides of said block and equi-distantly disposed in relation thereto.

JOSEPH K. NITSCH.